United States Patent
Wan

(10) Patent No.: US 7,711,203 B2
(45) Date of Patent: May 4, 2010

(54) IMPULSIVE NOISE REMOVAL USING MAXIMUM AND MINIMUM NEIGHBORHOOD VALUES

(75) Inventor: Wade Keith Wan, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 1187 days.

(21) Appl. No.: 10/875,235

(22) Filed: Jun. 25, 2004

(65) Prior Publication Data

US 2005/0276488 A1 Dec. 15, 2005

Related U.S. Application Data

(60) Provisional application No. 60/578,066, filed on Jun. 9, 2004.

(51) Int. Cl.
*G06K 9/36* (2006.01)
(52) U.S. Cl. ............ 382/260; 382/232; 382/275; 375/E7.19
(58) Field of Classification Search ............ 382/195, 382/262, 232, 275
See application file for complete search history.

(56) References Cited

U.S. PATENT DOCUMENTS

| 5,341,224 | A | * | 8/1994 | Eschbach | 358/3.27 |
|---|---|---|---|---|---|
| 5,844,627 | A | * | 12/1998 | May et al. | 348/607 |
| 6,415,063 | B1 | * | 7/2002 | Pourjavid | 382/275 |
| 6,690,429 | B1 | * | 2/2004 | Kim | 348/625 |
| 6,873,741 | B2 | * | 3/2005 | Li | 382/266 |
| 7,034,962 | B2 | * | 4/2006 | Suzuki | 358/2.1 |
| 7,280,142 | B2 | * | 10/2007 | Toyoda et al. | 348/246 |
| 2002/0150305 | A1 | * | 10/2002 | Gil et al. | 382/260 |
| 2003/0095718 | A1 | * | 5/2003 | Yamazaki | 382/262 |
| 2003/0122969 | A1 | * | 7/2003 | Higuchi | 348/607 |
| 2004/0170339 | A1 | * | 9/2004 | Maurer | 382/274 |
| 2007/0274605 | A1 | * | 11/2007 | Yahil | 382/275 |

OTHER PUBLICATIONS

R.C. Gonzalez and R.E. Woods, "Digital Image Processing", Prentice Hall, 2002, pp. 230-243.*
R.C. Gonzalez and R.E. Woods, "Digital Image Processing", Addison_Wesley Publishing Company, 1992, pp. 191-195.
W.H. Press et al., "Numerical Recipes in C: The Art of Scientific Computing", Second Edition, Cambridge University Press, 1992, pp. 329-330.

* cited by examiner

*Primary Examiner*—Bhavesh M Mehta
*Assistant Examiner*—Stephen R Koziol
(74) *Attorney, Agent, or Firm*—Sterne, Kessler, Goldstein & Fox P.L.L.C.

(57) ABSTRACT

A system and method for removing impulsive noise from a digital signal are disclosed. The system and method determines either a neighborhood maximum and/or a neighborhood minimum for a pixel of interest. The intensity of the pixel of interest is then compared to the neighborhood maximum or the neighborhood minimum to determine whether the pixel of interest should be replaced.

27 Claims, 5 Drawing Sheets

| 10 | 15 | 10 | 12 | 20 |
|----|----|----|----|----|
| 15 | 10 | 99 | 18 | 10 |
| 12 | 15 | 10 | 20 | 18 |

FIG. 5

IMPULSIVE NOISE REMOVAL USING MAXIMUM AND MINIMUM NEIGHBORHOOD VALUES

CROSS REFERENCE TO RELATED APPLICATIONS

This application claims priority from U.S. provisional application No. 60/578,066 filed on Jun. 9, 2004, and titled "Impulsive Noise Removal Using Maximum and Minimum Neighborhood Values" which is incorporated by reference herein in its entirety.

FIELD OF THE INVENTION

The present invention relates generally to signal processing and in particular to the compression of digital images and video. More specifically, the present invention relates to a system and method for removing impulsive noise using maximum and minimum neighborhood values.

BACKGROUND OF THE INVENTION

Digital video products and services and devices for storage and retrieval of video streams on the Internet are ubiquitous in the marketplace. Due to limitations in digital signal storage capacity and limitations in network and broadcast bandwidth, compression of digital video signals is essential to digital video storage and transmission. As a result, many standards for compression and encoding of digital video signals, such as MPEG-2 and MPEG-4, have been promulgated. These standards specify with particularity the form of encoded digital video signals and how such signals are to be decoded for presentation to a viewer.

Video preprocessing techniques may be applied to incoming digital video signals so that the signals may be more efficiently compressed by subsequent video compression circuitry. For example, a preprocessor may detect noise in a frame and reduce or remove the noise in the frame before transmitting the frame to the video compression circuitry. Removing noise from digital video signals is not only important for improving the visual quality of the signal, but also for increasing the efficiency of the MPEG video encoders.

Various noise artifacts associated with digital video signals are known in the art. Impulsive noise, also known as salt-and-pepper noise, is defined as individual pixels whose intensity values are much larger or smaller than that of its surrounding neighbors. Often, these impulsive pixels are the result of some type of error or noise and require correction and/or concealment. In some instances, even if the pixel of interest correctly represents the true intensity of a given location at a particular point of time, it is still desirable to treat the impulsive pixel as noise. An example of this is in digital images and video where high frequency content, which includes impulsive pixels, is not only very distracting to a viewer but also very difficult for compression algorithms to effectively compress. The use of bits to compress these impulses takes away bandwidth that could be used more effectively on other parts of the picture. For this reason, a variety of algorithms have been developed in the prior art to reduce and/or remove impulsive noise.

A popular approach to impulsive noise removal is disclosed in "Digital Image Processing" by R. C. Gonzalez and R. E. Woods, Addison_Wesley Publishing Company, 1992, pp. 191-195. Gonzalez and Woods describe a median filter where the median of a set of local neighborhood values is calculated and may be used (adaptively or nonadaptively) to replace the pixel of interest. The median is a value that is both (a) less than half the values in the set and (b) greater than half the values in the set. Referring now to FIG. 5, there is shown an example of neighborhood data where the pixel with intensity value of 99 is the pixel of interest. As an example of median filtering, the 3×5 pixel neighborhood data shown in FIG. 5 contains the values:

(10, 15, 10, 12, 20, 15, 10, 99, 18, 10, 12, 15, 10, 20, 18).

Sorting these values results in:

(10, 10, 10, 10, 10, 12, 12, 15, 15, 15, 18, 18, 20, 20, 99).

Therefore, a median filter would use the value of 15 to replace the impulsive value of 99 at the pixel of interest in the center.

One disadvantage of median filtering for both hardware and software implementations is that the calculation of the median requires the neighborhood values to first be sorted. Sorting algorithms not only require computational resources (approximately $N*\log_2 N$ operations to sort N elements) but may also require additional resources such as memory and code space. Therefore, it is desirable to have a system and method for impulsive noise removal that reduces the necessary computations, thereby resulting in a faster and more efficient method for impulsive removal.

Further limitations and disadvantages of conventional and traditional approaches will become apparent to one of skill in the art through comparison of such systems with the present invention as set forth in the remainder of the present application with reference to the drawings.

SUMMARY OF THE INVENTION

According to the present invention, these objects are achieved by a system and method as defined in the claims. The dependent claims define advantageous and preferred embodiments of the present invention.

A system and method for removing impulsive noise from a digital signal using the maximum and minimum values in a local neighborhood are disclosed. The methodology described in the present invention differs from the well-known method of using a median filter for impulsive noise removal by using the maximum and minimum operators instead of the median operator. These operations greatly reduce the computations necessary for each pixel, which is a significant factor for many hardware and software implementations. Thus, the principles of the present invention advantageously reduces and/or removes impulsive pixels regardless of their origin.

In one aspect, the present invention processes a video signal comprising a sequence of frames, each of which further comprises a plurality of pixels. The present invention determines a neighborhood maximum or a neighborhood minimum for a pixel of interest, and compares the intensity of the pixel of interest to the neighborhood maximum or the neighborhood minimum to determine whether the pixel of interest should be replaced. The pixel of interest is replaced with a minimum replacement value if the intensity of the pixel of interest is less than the neighborhood minimum. In one embodiment, the minimum replacement value is the neighborhood minimum. The pixel of interest is replaced with a maximum replacement value if the intensity of the pixel of interest is greater than the neighborhood maximum. In one embodiment, the maximum replacement value is the neighborhood maximum.

In another aspect, the present invention compares the sum of the intensity of the pixel of interest and a LOW_OFFSET to the neighborhood minimum. The pixel of interest is then replaced with a minimum replacement value if the sum of the intensity of the pixel of interest and the LOW_OFFSET is less than the neighborhood minimum. In one embodiment, the minimum replacement value is the neighborhood minimum. The present invention may also compare the intensity of the pixel of interest to the sum of a HIGH_OFFSET and the neighborhood maximum. The pixel of interest is then replaced with a maximum replacement value if the intensity of the pixel of interest is greater than the sum of the HIGH_OFFSET and the neighborhood maximum. In one embodiment, the maximum replacement value is the neighborhood maximum.

In calculating the neighborhood maximum or the neighborhood minimum for one embodiment of the present invention, the neighborhood does not include the pixel of interest. Additionally, the size of the neighborhood for calculating the neighborhood maximum or the neighborhood minimum may be as large or as small as desired. For example, a neighborhood may be an M×N neighborhood or a non-rectangular shaped neighborhood. The neighborhood may also be an adjustable neighborhood in which the size and/or shape of the neighborhood may be adjusted based on some metric or set of criteria. For example, in one embodiment, the size of the neighborhood may be adjusted for pixels lying on the boundary.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

FIG. 5 illustrates a block diagram of an example of neighborhood data where the pixel with intensity value of 99 is the pixel of interest.

DETAILED DESCRIPTION OF THE INVENTION

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art that the detailed description given herein is for explanatory purposes as the invention extends beyond these limited embodiments and that the present invention may be practiced without some or all of these specific details. In other instances, well known processes and steps have not been described in detail in order not to unnecessarily obscure the present invention.

Figure 1:
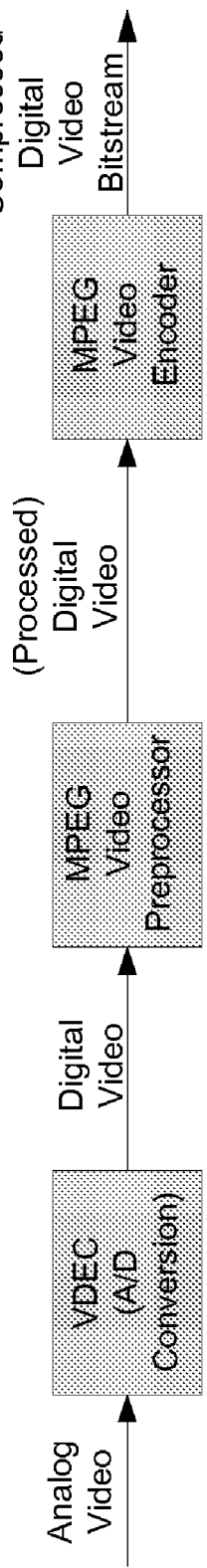
FIG. 1 illustrates a block diagram of an MPEG video preprocessor in accordance with one embodiment of the present invention.

Referring now to FIG. 1, there is shown a block diagram of an MPEG video preprocessor in accordance with one embodiment of the present invention. The video preprocessor implements an impulse filter as described in the present invention to condition a digital video signal for better compression by an MPEG video encoder by removing unwanted or irrelevant picture information such as random noise. In accordance with a preferred embodiment of the present invention, the MPEG video preprocessor receives digital video and outputs conditioned digital video intended for compression by an MPEG video encoder, such as by the BCM7042 MPEG-2 Video/Audio Encoder, produced by Broadcom Corporation, located in Irvine, Calif. In another embodiment, the video preprocessor may be integrated into an encoder such as the BCM7042.

Figure 2:
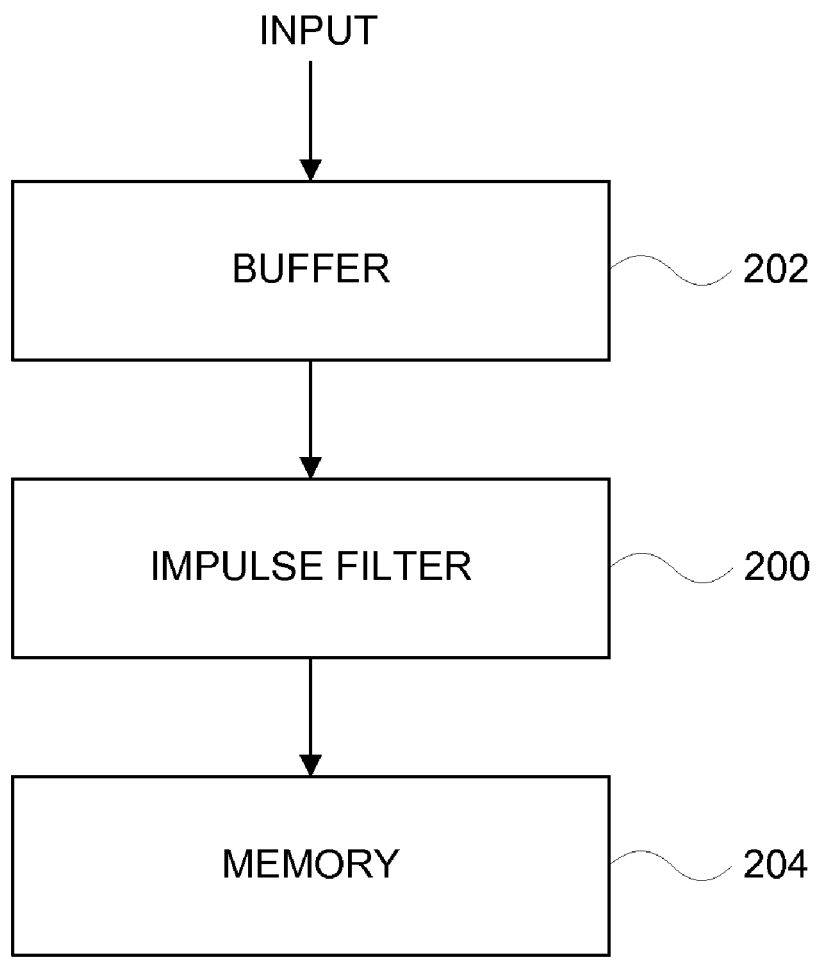
FIG. 2 illustrates a block diagram of an impulse filter in accordance with one embodiment of the present invention.

An overview of the dataflow and buffers for an impulse filter in accordance with one embodiment of the present invention is shown in FIG. 2. FIG. 2 illustrates an impulse filter 200, a buffer 202 coupled to the input of the impulse filter 200, and memory 204 coupled to the output of the impulse filter 200. One skilled in the art will realize that the outputted digital signal does not necessarily need to be transferred directly to a memory 204, but may be transferred to another module such as an MPEG encoder, a hard drive, and the like.

Figure 5:
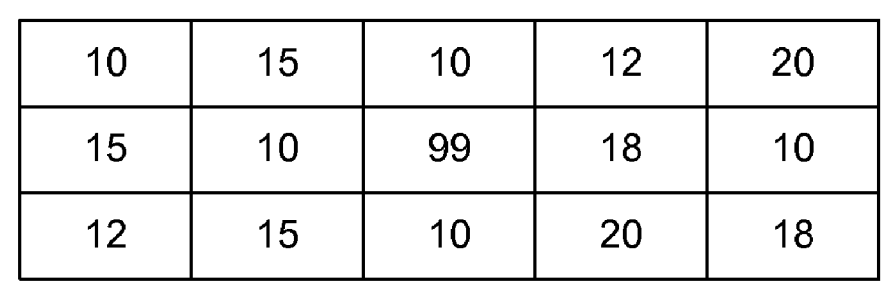

In one aspect, impulsive noise reduction of the present invention is generally performed by first computing the minimum and maximum values in the neighborhood. In one embodiment, this definition of neighborhood does not include the pixel of interest. Therefore, there will be N−1 elements in this neighborhood and computing the neighborhood minimum and maximum will require 2*(N−2) total comparisons. Referring now to FIG. 5, there is shown an example of neighborhood data. As defined here, X represents the intensity value of the pixel of interest and LOCALMIN and LOCALMAX represent the neighborhood minimum and maximum, respectively. The pixel of interest is classified as an impulsive pixel and replaced only in these two scenarios:

1. Its intensity is less than the local minimum, i.e. X<LOCALMIN.
2. Its intensity is greater than the local maximum, i.e. X>LOCALMAX.

Thus, referring to the example data in FIG. 5, X, LOCALMIN and LOCALMAX would be equal to 99, 10 and 20, respectively, and LOCALMAX (with the value of 20) could be used to replace the pixel of interest.

Figure 3:
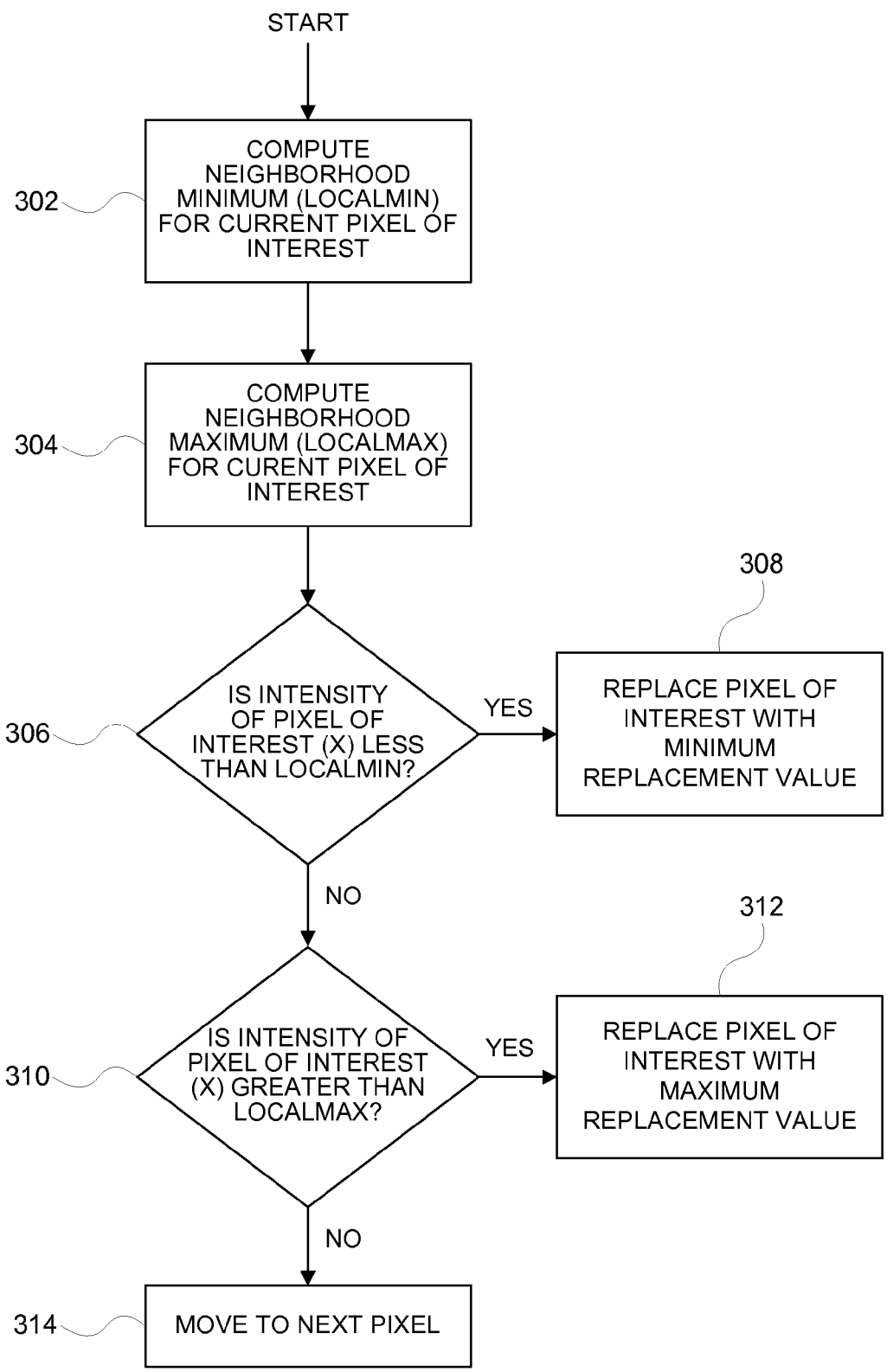
FIG. 3 is a flow chart illustrating the steps of an impulse filter in accordance with one embodiment of the present invention.

More specifically, referring now to FIG. 3, there is shown a flow chart illustrating the steps of an impulse filter in accordance with one embodiment of the present invention. At step 302, the neighborhood minimum (LOCALMIN) for the current pixel of interest is calculated. At step 304, the neighborhood maximum (LOCALMAX) for the current pixel of interest is calculated. The intensity of the current pixel of interest (X) is then compared to both values at steps 306 and 310. If the intensity of the pixel of interest is less than LOCALMIN, then the intensity of the current pixel of interest is replaced with a minimum replacement value at step 308. The minimum replacement value may be any intensity value used to replace pixels whose intensity is lower than LOCALMIN. In a preferred embodiment, the minimum replacement value is the LOCALMIN value. If the intensity of the pixel of interest is greater than the LOCALMAX, then the intensity of the current pixel of interest is replaced with a maximum replacement value at step 312. The maximum replacement value may be any intensity value used to replace pixels whose intensity is greater than LOCALMAX. In a preferred embodiment, the maximum replacement value is the LOCALMAX value.

One skilled in the art will realize that the present invention is not limited to this specific sequence of steps, but that the present invention may be practiced in any desirable sequence while still encompassing the principles underlying the present invention. For example, the present invention may be practiced by first calculating the LOCALMIN and then determining whether the intensity of the current pixel of interest is less than the LOCALMIN. If it is and the pixel of interest is replaced, then it may not be necessary to calculate the LOCALMAX or perform the subsequent LOCALMAX comparison.

Moreover, the size of the neighborhood for calculating LOCALMIN and LOCALMAX is not constrained and may be as large or as small as desired. For example, in a preferred embodiment, a neighborhood may be an M×N neighborhood, such as 1×5 or 3×5 as illustrated in FIG. 5. Alternatively, the neighborhood may also be a non-rectangular shaped neighborhood. The neighborhood may also be an adjustable neighborhood in which the size and/or shape of the neighborhood may be adjusted based on some metric or set of criteria. For example, in one embodiment, the size of the neighborhood may be adjusted for pixels lying on the boundary.

In another embodiment of the present invention, two offsets are defined that allow scalability of the impulse filter: LOW_OFFSET and HIGH_OFFSET. In this embodiment, the pixel of interest will then be replaced in only one of these scenarios:

1. The sum of the pixel's intensity and the low offset is less than the local minimum, i.e. (X+LOW_OFFSET)<LOCALMIN.
2. The pixel's intensity is greater than the sum of the local maximum and the high offset, i.e. X>(LOCALMAX+HIGH_OFFSET).

Thus, setting LOW_OFFSET and HIGH_OFFSET both to zero result in the conditions described above with reference to FIG. 3. Increasing values of LOW_OFFSET and HIGH_OFFSET above zero will cause the conditions to be satisfied less frequently and thereby resulting in fewer pixels to be filtered.

More specifically, when the intensity of the pixel of interest is greater than the maximum value of every other pixel in the neighborhood plus an adjustable offset, i.e., then the pixel of interest is replaced by the maximum pixel in the neighborhood. When the intensity of the pixel of interest is less than the minimum value of every other pixel in the neighborhood plus an adjustable offset, then the pixel of interest is replaced by the minimum pixel in the neighborhood.

Figure 4:
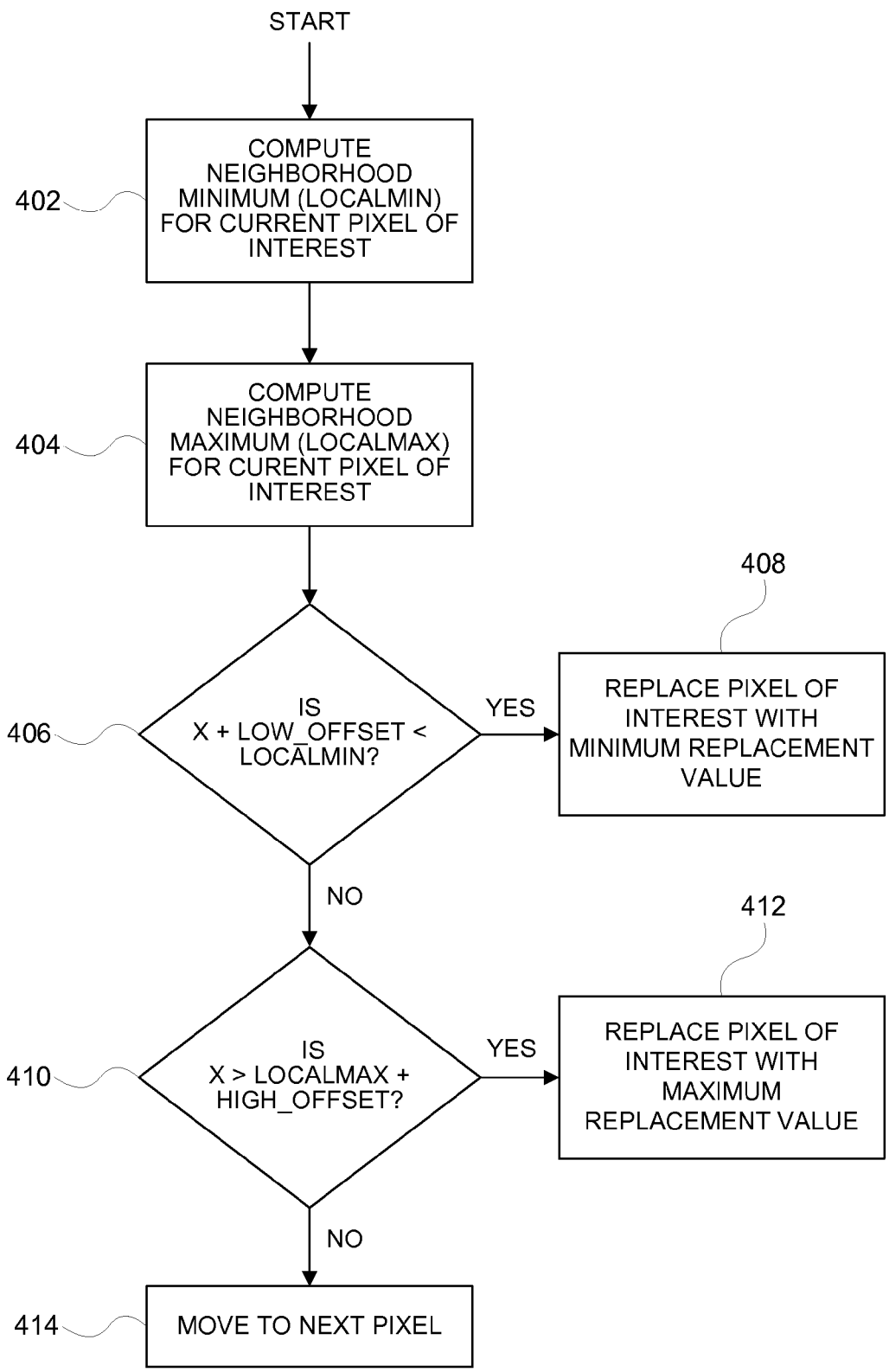
FIG. 4 is a flow chart illustrating the steps of an impulse filter in accordance with another embodiment of the present invention.

Referring now to FIG. 4, there is shown a flow chart illustrating the steps of an impulse filter in accordance with another embodiment of the present invention. At step 402, the neighborhood minimum (LOCALMIN) for the current pixel of interest is calculated. At step 404, the neighborhood maximum (LOCALMAX) for the current pixel of interest is calculated. The intensity of the current pixel of interest (X) is then compared to the LOCALMIN and a LOW_OFFSET. More specifically, at step 406, the sum of the pixel's intensity of interest and the LOW_OFFSET are compared to the LOCALMIN. If this sum is less than the LOCALMIN, then the intensity of the current pixel of interest is replaced with a minimum replacement value at step 408. The minimum replacement value may be any intensity value used to replace pixels whose sum of its intensity and a LOW_OFFEST is lower than LOCALMIN. In a preferred embodiment, the minimum replacement value is the LOCALMIN value.

The intensity of the current pixel of interest (X) may then compared to the LOCALMAX and a HIGH_OFFSET. More specifically, at step 410, the pixel's intensity of interest is compared to the sum of the LOCALMAX and the HIGH_OFFSET. If the pixel's intensity is greater than this sum, then the intensity of the current pixel of interest is replaced with a maximum replacement value at step 412. The maximum replacement value may be any intensity value used to replace pixels whose intensity is greater than the sum of LOCALMAX and the HIGH_OFFSET. In a preferred embodiment, the maximum replacement value is the LOCALMAX value.

As already described above, one skilled in the art will realize that the present invention is not limited to this specific sequence of steps, but that the present invention may be practiced in any desirable sequence while still encompassing the principles underlying the present invention. Moreover, the values of LOW_OFFSET and HIGH_OFFSET may be determined according to the requirements of processing. Additionally, the size of the neighborhood for calculating LOCALMIN and LOCALMAX is not constrained and may be as large or as small as desired. For example, in a preferred embodiment, a neighborhood may be an M×N neighborhood, such as 1×5 or 3×5 as illustrated in FIG. 5. Alternatively, the neighborhood may also be a non-rectangular shaped neighborhood. The neighborhood may also be an adjustable neighborhood in which the size and/or shape of the neighborhood may be adjusted based on some metric or set of criteria. For example, in one embodiment, the size of the neighborhood may be adjusted for pixels lying on the boundary.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. For example, impulsive noise removal as disclosed in the present invention is often used to process digital images and video but the general concept could also be applied to other applications including one-dimensional and multi-dimensional signal processing. Therefore, it is intended that the invention not be limited to the particular embodiment disclosed, but that the invention will include all embodiments falling within the scope of the appended claims.

What is claimed is:

1. A method of processing a video signal in an electronic video preprocessor, the video signal comprising a sequence of frames, each of the frames comprising a plurality of pixels, the method comprising the steps of:
   determining a neighborhood maximum or a neighborhood minimum for a pixel of interest;
   comparing a sum of an intensity of the pixel of interest and an offset to the neighborhood minimum, or a sum of the neighborhood maximum and an offset to the intensity of the pixel of interest, to determine whether the pixel of interest should be replaced;
   replacing the pixel of interest with a minimum replacement value if the sum of the intensity of the pixel of interest and an offset is less than the neighborhood minimum; and
   replacing the pixel of interest with a maximum replacement value if the intensity of the pixel of interest is greater than the sum of the neighborhood maximum and an offset.

2. The method of claim 1, wherein the minimum replacement value is the neighborhood minimum.

3. The method of claim 1, wherein the maximum replacement value is the neighborhood maximum.

4. The method of claim 1, wherein the neighborhood does not include the pixel of interest.

5. The method of claim 1, wherein the neighborhood for the pixel of interest is an M×N neighborhood.

6. The method of claim 1, wherein the neighborhood for the pixel of interest is an 1×5 neighborhood.

7. The method of claim 1, wherein the neighborhood for the pixel of interest is a non-rectangular neighborhood.

8. The method of claim 1, wherein the neighborhood for the pixel of interest is adjusted based on a metric.

9. The method of claim 1, wherein the neighborhood for the pixel of interest is an adjustable neighborhood.

10. An apparatus for processing a video signal comprising a sequence of frames, each of the frames comprising a plurality of pixels, the apparatus comprising:
    a memory for storing one or more frames of the sequence of frames; and
    an impulse filter for removing or reducing impulsive noise from each frame using maximum and minimum neighborhood values, wherein the impulse filter compares the sum of an intensity of a pixel of interest and an offset to the neighborhood maximum or the sum of the neighborhood maximum, and an offset to the intensity of the pixel of interest, to determine whether the pixel of interest should be replaced,
    wherein the impulse filter replaces the pixel of interest with a minimum replacement value if the sum of the intensity of the pixel of interest and an offset is less than the neighborhood minimum,
    wherein the impulse filter replaces the pixel of interest with a maximum replacement value if the intensity of the pixel of interest is greater than the sum of the neighborhood maximum and an offset.

11. The apparatus of claim 10, wherein the minimum replacement value is the neighborhood minimum.

12. The apparatus of claim 10, wherein the maximum replacement value is the neighborhood maximum.

13. The apparatus of claim 10, wherein the neighborhood does not include the pixel of interest.

14. The apparatus of claim 10, wherein the neighborhood for the pixel of interest is an M×N neighborhood.

15. The apparatus of claim 10, wherein the neighborhood for the pixel of interest is an 1×5 neighborhood.

16. The apparatus of claim 10, wherein the neighborhood for the pixel of interest is a non-rectangular neighborhood.

17. The apparatus of claim 10, wherein the neighborhood for the pixel of interest is adjusted based on a metric.

18. The apparatus of claim 10, wherein the neighborhood for the pixel of interest is adjustable neighborhood.

19. An impulse filter for replacing a pixel of interest in a frame, the impulse filter comprising:
    means for determining a neighborhood maximum or a neighborhood minimum for the pixel of interest;
    means for comparing the sum of an intensity of the pixel of interest and an offset to the neighborhood minimum, or the sum of the neighborhood maximum and an offset to the intensity of the pixel of interest, to determine whether the pixel of interest should be replaced;
    means for replacing the pixel of interest with a minimum replacement value if the sum of the intensity of the pixel of interest and an offset is less than the neighborhood minimum; and
    means for replacing the pixel of interest with a maximum replacement value if the intensity of the pixel of interest is greater than the sum of the neighborhood maximum and an offset.

20. The filter of claim 19, wherein the minimum replacement value is the neighborhood minimum.

21. The filter of claim 19, wherein the maximum replacement value is the neighborhood maximum.

22. The filter of claim 19, wherein the neighborhood does not include the pixel of interest.

23. The filter of claim 19, wherein the neighborhood for the pixel of interest is an M×N neighborhood.

24. The filter of claim 19, wherein the neighborhood for the pixel of interest is an 1×5 neighborhood.

25. The filter of claim 19, wherein the neighborhood for the pixel of interest is a non-rectangular neighborhood.

26. The filter of claim 19, wherein the neighborhood for the pixel of interest is adjusted based on a metric.

27. The filter of claim 19, wherein the neighborhood for the pixel of interest is adjustable neighborhood.

* * * * *